United States Patent [19]

Haskins

[11] Patent Number: 4,869,163
[45] Date of Patent: Sep. 26, 1989

[54] SMOKING UNIT FOR GAS GRILLS

[76] Inventor: Gene B. Haskins, P.O. Box 446, Greenwood, La. 71033

[21] Appl. No.: 246,156

[22] Filed: Sep. 19, 1988

[51] Int. Cl.$^4$ .............................................. A23B 4/04
[52] U.S. Cl. ...................................... 99/482; 99/481; 99/467; 99/340; 99/401; 99/446; 126/163 R
[58] Field of Search ................. 99/467, 481, 482, 401, 99/339, 340, 473, 474, 425, 444, 447, 446; 126/39 H, 39 J, 39 K, 163 R

[56] References Cited

U.S. PATENT DOCUMENTS

| | | | |
|---|---|---|---|
| 434,052 | 8/1890 | Sims | 99/481 X |
| 592,256 | 10/1897 | Ryder | 99/473 |
| 3,593,647 | 7/1971 | Copeland, Jr. | 99/482 X |
| 3,683,791 | 8/1972 | Rast, jr. | 99/340 |
| 4,140,049 | 2/1979 | Stewart | 99/482 X |
| 4,300,444 | 11/1981 | Muse | 99/482 X |
| 4,334,462 | 6/1982 | Hefling | 99/467 X |
| 4,495,860 | 1/1983 | Hitch et al. | 99/482 X |
| 4,512,249 | 4/1985 | Mentzel | 99/482 X |
| 4,554,864 | 11/1985 | Smith et al. | 99/482 X |
| 4,721,037 | 1/1988 | Blosnich | 99/467 X |

FOREIGN PATENT DOCUMENTS

| | | | |
|---|---|---|---|
| 1013897 | 3/1950 | France | 99/473 |
| 294001 | 7/1928 | United Kingdom | 99/474 |
| 462612 | 3/1937 | United Kingdom | 99/339 |
| 2102275 | 2/1983 | United Kingdom | 99/467 |

OTHER PUBLICATIONS

Pct Application to Wheat, WO 8500962, 3/1985.

Primary Examiner—Stephen Marcus
Assistant Examiner—Christine A. Peterson
Attorney, Agent, or Firm—John M. Harrison

[57] ABSTRACT

A smoking unit for a gas grill, which smoking unit is characterized by a housing shaped to fit inside the gas grill, a bottom provided in the housing for receiving a quantity of smoke-generating wood chips and a perforated smoke tray located above the bottom panel for containing a water or flavor-enhancing liquid and channeling smoke to a grill or grate which supports meat or other food to be smoked. An access opening is located in the front of the housing adjacent to the gas grill lid to facilitate access to the smoked food when the lid is raised. In a first preferred embodiment of the invention the smoking unit is constructed as a separate unit for removable insertion in an existing gas grill and in a second preferred embodiment, the smoking unit is shaped integrally with or is permanently mounted in the gas grill.

4 Claims, 1 Drawing Sheet

SMOKING UNIT FOR GAS GRILLS

BACKGROUND OF THE INVENTION

1. Field of the Invention

Gas grills, including those grills which are operated by propane or butane, as well as natural gas-fired grills, have enjoyed increasing popularity in recent years. A primary advantage of these grills is the capability of being attached to natural gas lines which are normally provided in the home or to low pressure, gas-filled bottles such as propane and butane-containing vessels, which are easily used and transported to and from the gas grill for refilling purposes. Conventional gas grills are typically mounted on a base or pedestal and include a burner unit which receives a gas burner, a grill or grate supported by the burner unit and hinged lid which may be opened and closed to adjust the heat and the cooking temperature in the gas grill. Lava rocks may also be provided in the bottom of the burner unit above the burner, in order to help maintain the heat content of the gas grill at a desired level. One or more burner control valves are also provided in cooperation with the selected low pressure gas source, in order to further adjust the heat in the gas grill. Gas grills are commonly used for grilling various meats such as fish, chicken, hamburger, steak, pork and the like and may also be used for warming bread and other food, as well as cooking vegetables, such as corn and potatoes.

Devices for smoking various meats, including fish, chicken, pork, steak, hamburger and the like, have enjoyed an increase in popularity, particularly in recent years. A primary element of these smoker devices is a smoking chamber for containing the meat or other food to be smoked, which smoking chamber is normally located above a charcoal fire and may include a container of water, wine or sherry, in order to provide the desired moisture and flavoring during cooking. Various types of wood chips, including mesquite, oak, pecan and hickory chips may be placed in the charcoal fire to produce smoke having a selected flavor for flavoring the food during the cooking and smoking process. These smokers are normally designed to cook meat over a long period of time and since a charcoal fire is normally used, the charcoal must be continuously replenished while the meat is cooking, in order to maintain the smoking chamber at a desired cooking and smoking temperature.

One of the problems associated with conventional natural and low-pressure, gas-fired grills is the lack of a smoking chamber where meat and other food may be placed for smoking purposes, as in the charcoal smoker device. Furthermore, a disadvantage of conventional charcoal smokers is the lack of facility for efficient grilling of steaks and other meat, wherein the meat should be cooked rapidly. Accordingly, it is an object of this invention to provide a new and improved grilling and smoking device which combines the best features of the gas grill and the charcoal smoker in cooking and/or smoking meat, vegetables and other food in a desired period of time.

Another object of the invention is to provide a smoking unit for gas grills which operates to prevent grease fires in the gas grill when the gas grill is used in a conventional manner to cook food.

A further object of the invention is to provide a smoking unit for gas grills, which smoking unit includes a housing located inside the gas grill a slotted bottom panel designed to receive wood chips for generating smoke, a grill or grate located above the bottom panel for containing food to be smoked and an access opening in the housing to provide access to the grate.

Another object of the invention is to provide a smoking unit for gas grills, which smoking unit includes a housing shaped to fit in the gas grills, which housing is characterized by a slotted bottom panel for receiving wood chips of desired character, a perforated or vented smoke tray located above the bottom panel and the wood chips for containing a quantity of water, or other liquid, a grill or grate positioned above the smoke tray to support the food and an access opening facing the grate to provide access to the food located on the grate.

Yet another object of this invention is to provide a new and improved smoking unit for conventional natural gas or low pressure, gas-fired grills, which smoking unit is characterized by a removable housing designed to fit in the gas grill and a smoke-generating chamber for containing smoldering wood chips, a removable or permanently-mounted smoke tray located above the smoke-generating chamber, which smoke tray is provided with one or more chimneys or vents for channeling smoke from the smoking chamber to a grate located above the tray and an access opening for attending to the cooking of meat or other food located on the grill.

Still another object of this invention is to provide a gas grill having a smoking unit built therein, which smoking unit includes a housing shaped for containment by the gas grill, a smoking chamber fitted for receiving wood chips located in the bottom of the housing, a smoke tray positioned above the smoking chamber for containing water, wine, sherry or other flavor-enhancing and/or humidifying liquid, with at least one smoke vent provided in the smoke tray for venting smoke to a food-supporting grate mounted above the smoke tray.

SUMMARY OF THE INVENTION

These and other objects of the invention are provided in a new and improved smoking unit for a gas grill, which smoking unit may be either permanently built into the gas grill or designed for removable insertion and mounting in the gas grill. In a preferred embodiment, the smoking unit is characterized by a slotted bottom panel provided with upward-standing, spaced partitions for receiving wood chips of desired character, a smoke tray mounted above the bottom panel for containing water or wine and fitted with at least one chimney or smoke vent for transmitting smoke from the smoking chamber to a grill or grate positioned above the smoke tray and an access opening for handling meat and other food located on the grate.

BRIEF DESCRIPTION OF THE DRAWING

The invention will be better understood by reference to the accompanying drawing, wherein.

DESCRIPTION OF THE PREFERRED EMBODIMENTS

Figure 1:
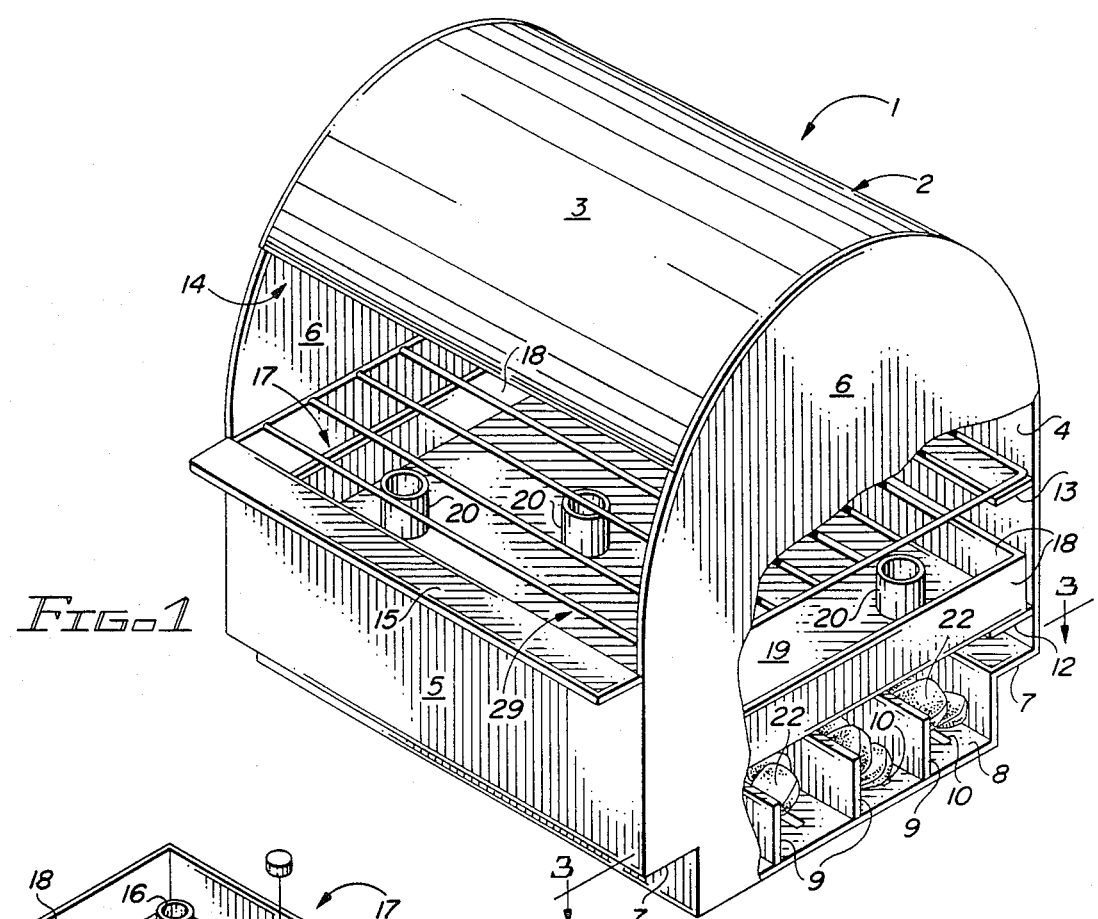
FIG. 1 is a perspective view, partially in section, of a first preferred embodiment of the smoking unit for gas grills of this invention.
Figure 2:
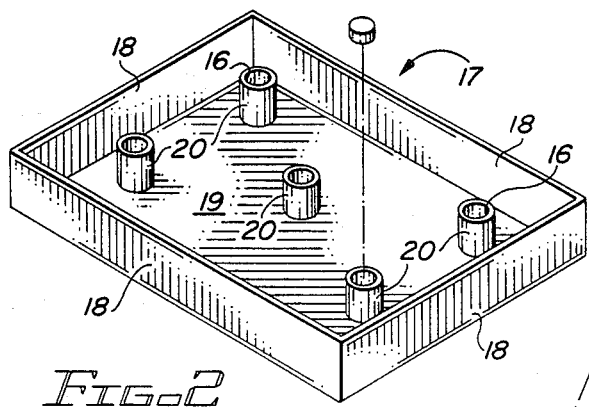
FIG. 2 is a perspective view of a preferred vented smoke tray for use in the smoking unit illustrated in FIG. 1.
Figure 3:
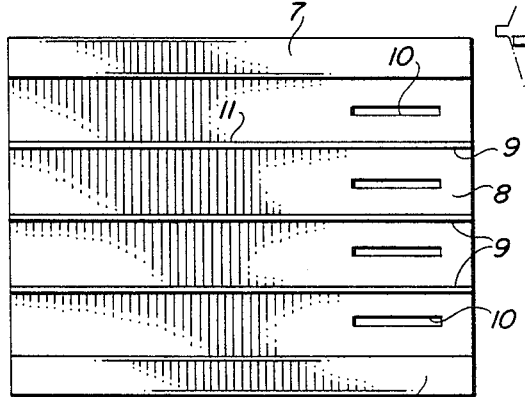
FIG. 3 is a top view of a preferred smoke-generating chamber element of the smoking unit illustrated in FIG. 1.

Referring initially to FIG. 1 of the drawing, the smoking unit of this invention is generally illustrated by reference numeral 1 and includes a box-like housing 2, having a rounded top panel 3 which curves downwardly in spaced relationship to define a rear panel 4 and a front panel 5 that are terminated at each end by a pair of side panels 6. In a preferred embodiment of the invention, oppositely-disposed, spaced and parallel shoulders 7 are provided in the lower portions of the rear panel 4 and the front panel 5 of the housing 2, for purposes which will be hereinafter further described. The bottom portion of the housing 2 is characterized by a smoke-generating chamber 8, which is defined by a flat bottom panel 11, provided with spaced bottom panel slots 10 on one end and upward-standing, spaced partitions 9. The bottom panel 11 and the parallel partitions 9 are designed to create individual smoke-generating compartments which together define the smoke-generating chamber 8 and are adapted to receive a quantity of wood chips 22 for generating smoke, as hereinafter further described. Oppositely-disposed, spaced and parallel tray supports 12 are welded or otherwise provided in inwardly-extending, facing relationship in the rear panel 4 and the front panel 5, in order to permanently or removably receive and support a smoke tray 17. In a most preferred embodiment of the invention the smoke tray 17 is provided with a flat tray bottom 19 and four upward-standing tray sides 18, for containing a supply of water or a flavor-enhancing liquid such as wine or sherry, in non-exclusive particular. Multiple chimneys or smoke vents 20 are also fitted in the tray bottom 19 and the openings 16 in the upward-standing smoke vents 20 communicate with the smoke-generating chamber 8, in order to receive smoke generated by the burning wood chips 22 and convey the smoke upwardly to a grate 29, located on the grate supports 13 above the smoke tray 17. It will be appreciated by those skilled in the art that while multiple smoke vents 20 are illustrated in the smoke tray 17, more or fewer smoke vents 20 of varying diameter and selected spacing may be provided, as desired. Furthermore, caps 21 may be provided for sealing one or more of the openings 16 in the smoke vents 20, in order to control the density of the smoke in the area of the grate 29 and channel the smoke to one side or the other in the upper portion of the smoking unit 1, as desired. The oppositely-disposed, parallel, inwardly-facing grate supports 13 are welded or otherwise fixedly attached to the rear panel 4 and the front panel 5, respectively, of the housing 2 above the tray supports 12, in order to support the grate 29 in permanent or removable fashion. An access opening 14 is provided in the housing 2 opposite the grate 29, in order to facilitate access ot the grate 29 and to turn or reposition meat or other food (not illustrated), located on the grate 29 for cooking and smoking. In a most preferred embodiment of the invention an access opening lip 15 extends outwardly of the housing 2 at the bottom extremity of the access opening 14, to facilitate ease in placing a tray, platter or alternative meat or other food-supporting container adjacent to the housing 2 when placing food on the grate 29, turning the food or removing the food from the grate 29.

Figure 4:
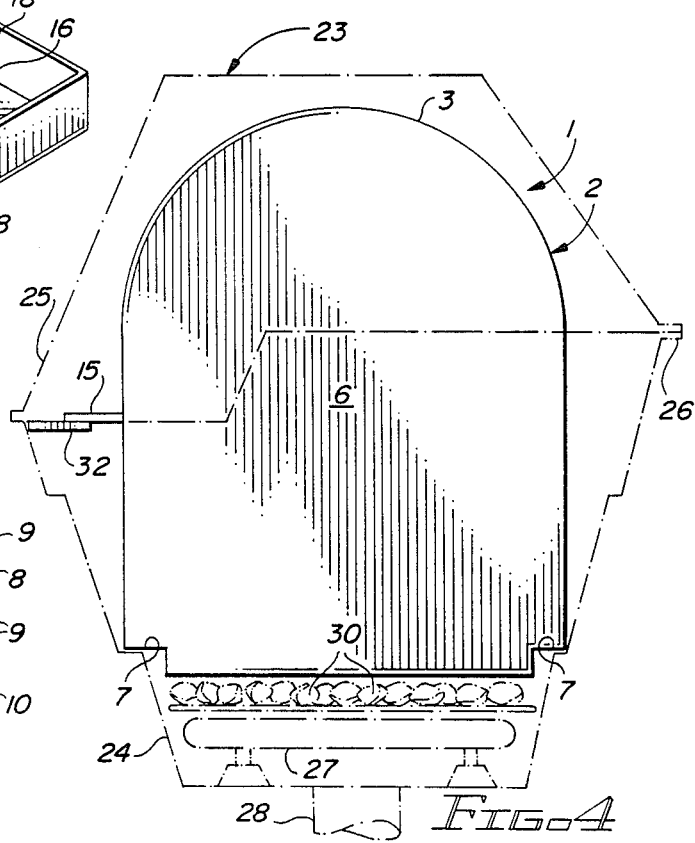
FIG. 4 is a right side view of the smoking unit illustrated in FIG. 1, wherein the smoking unit is contained within a conventional gas grill which is illustrated in phantom.

Referring now to FIGS. 1 and 4 of the drawings, it will be appreciated by those skilled in the art that the smoking unit 1 may be designed for removable insertion in an existing gas grill 23, wherein the shoulders 7 of the housing 2 rest on spaced companion support ledges 31, which are shaped in the burner unit 24 of the gas grill 23, as illustrated in phantom in FIG. 4. The housing 2 of the smoking unit 1 is so designed that the access opening lip 15 is further supported by a burner unit flange 32, which extends inwardly of the burner unit 24, as further illustrated in FIG. 4. The gas grill 23 is further characterized by a lip 25, which is attached to the burner unit 24 by means of a hinge 26, such that the lid 25 may be opened on the hinge 26 to provide access to the access opening 14 of the smoking unit 1. Furthermore, the gas grill 23 is fitted with a conventional burner 27, located in the base of the burner unit 24 and the burner unit 24 is further attached to an elongated pedestal or support 28, which receives a gas line (not illustrated) that is attached to the burner 27 and to a low pressure gas or natural gas source (not illustrated), in order to facilitate firing the burner 27 and heating the optional lava rocks 30, provided on a rock support 33. Appropriate control valves and an optional igniter element (not illustrated) are also provided in the gas grill 23, according to the knowledge of those skilled in the art, in order to control the operation of the gas grill 23 and the smoking unit 1.

Referring again to FIGS. 1 and 4 of the drawing, it will be appreciated that the smoking unit 1 can be removably seated in the burner unit 24 of the gas grill 23 by initially aligning the shoulders 7 of the housing 2 with the corresponding support ledges 31 shaped in the burner unit 24 and seating the smoking unit 1 in the gas grill 23. As heretofore described, this positioning of the housing 2 inside the burner unit 24 causes the access opening lip 15 to rest on the burner unit flange 32 and further support the smoking unit 1 inside the gas grill 23. Alternatively, the smoking unit 1 can be permanently installed or integrally shaped in the gas grill 23, as hereinafter described.

In operation, referring again to FIGS. 1–4 of the drawing, the lid 25 of the gas grill 23 is initially opened on the hinge 26 and in the embodiment of the invention where the grate 29 is removable, the grate 29 is then removed from the housing 2 of the smoking unit 1. The smoke tray 17 is then filled with water, wine, sherry or other desired liquid by either pouring the liquid directly into the smoke tray 17 through the access opening 14 or removing the smoke tray 17 from the tray supports 12 and extending the smoke tray 17 through the access opening 14, under circumstances where the smoke tray 17 is removably seated on the tray supports 12. In the latter case, when the smoke tray 17 is removed, wood chips 22 are placed on the bottom panel 11 in the smoke-generating chamber 8 and the smoke tray is then filled with liquid and replaced on the tray supports 12. Under circumstances where the smoke tray 17 is permanently installed in the housing 2, the wood chips 22 may be inserted in the smoke-generating chamber 8 through the openings 16 in the smoke vents 20. The burner 27 of the gas grill 23 is then ignited in conventional fashion to heat the lava rocks 30 and cause heat the rise through the bottom panel slots 10 in the bottom panel 11 of the smoke-generating chamber 8. This heat causes the wood chips 22, located in the smoke-generating chamber 8, to smolder, thereby generating smoke which drifts upwardly through the openings 16 in the smoke vent 20, to the grate 29. Meat or other food to be smoked is then inserted through the access opening 14 and is placed on the grate 29 and the lip 25 is closed on the burner unit 24 of the gas grill 23. When the lid 25 of the gas grill 23 is closed, smoke which is generated in the smoke-generating chamber 8 by the smoldering wood chips 22 is contained largely inside the housing 2 and the gas grill 23, to thoroughly smoke the meat or other food located on the grate 29 at a temperture which is determined by conventional controls (not illustrated) which communicate with the burner 27. The meat or other food can be periodically turned or shifted to various locations on the grate 29 by opening the lid 5 on the hinge 26 and extending cooking utensils through the access opening 14 in the housing 2 of the smoking unit 1. The water or flavoring liquid such as wine or sherry, which was placed in the smoke tray 17 before the smoking operation was commenced, serves to provide the desired humidifying and flavoring effect and prevents undesirable loss of moisture from the meat or other food being cooked and smoked.

Referring again to FIGS. 1 and 2 of the drawing, as heretofore described, it will be appreciated by those skilled in the art that the number and spacing of the smoke vents 20, as well as the size of the openings 16 may be varied, depending upon the desired density of smoke which is to be introduced to the grate 29. The desired degree of drying and smoking, as in the case of beef, venisen and other meats to make smoked jerky, for example, can be achieved by controlling the amount of liquid, if any is necessary, which is introduced into the smoke tray 17, or even by removing the smoke tray 17 from the smoking unit 1. Furthermore, the caps 21 may be used to close all of the openings 16 in the smoke vents 20 and the wood chips 22 may be removed from the smoke-generating chamber 8, in order to convert the smoking unit 1 into an oven for baking bread, casseroles and other food on the grate 29 in the housing 2.

It will be further appreciated by those skilled in the art that the smoking unit 1 can be permanently built into the gas grill 23 using techniques well known to those skilled in the art. For example, the housing 2 can be cast integrally with the burner unit 24 or the housing 2 may be shaped separately and subsequently mounted in the burner unit 24 by welding or otherwise securing the shoulder 7 to the support ledges 31 and the access opening lip 15 to the burner unit flange 32 using bolts, screws or other fasteners. Other suitable attachment poin ts, brackets, fittings and the like may be fitted in the gas grill 23 and to the housing 2 for permanently securing the smoking unit 1 inside the gas grill 23, according to the knowledge of those skilled in the art. Moreover, the conventional removable grill or grate which is supplied with the gas grill 23 may be used as the grate 29 in the housing 2 of the smoking unit 1, as desired.

It will be further appreciated by those skilled in the art that the smoking unit 1 can be constructed of materials normally used for conventional smoking units and gas grills, including cast iron and aluminum, in non-exclusive particular, Furthermore, it will be understood that the configuration of the housing 2 may be somewhat different from that illustrated in the drawing, in order to fit gas grills of specific design, this configuration being illustrative only. Moreover, the access opening 14 provided in the top portion of the housing 2 may be of any desired size and location and may be further provided with a hinged lid (not illustrated), as desired.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. In a gas-fired grill having a burner portion, a gas burner mounted in the burner portion and a lid hingedly connected to the burner portion for closing the gas-fired grill, the improvement in combination therewith further comprising a housing removably provided in the burner portion of the grill; an access opening provided in the top portion of the housing; a smoke-generating chamber provided in the bottom portion of said housing above the gas burner for receiving wood chips and generating smoke in said housing responsive to operation of the gas burner; a bottom panel provided in said housing and at least one slot provided in said bottom panel for transmitting heat directly from the gas grill into said housing; a grate removably located in said housing in close proximity to said acess opening for receiving food; and a tray removably and horizontally located in said housing between said grate and smoke-generating chamber, said tray having a flat bottom and sides upward-standing from said bottom for containing a liquid and further comprising at least one vent provided in upward-standing relationship in said bottom of said tray, said vent communicating with said smoke-generating chamber and said grate, for channeling the smoke generated in said smoke-generating chamber to said grate and smoking the food.

2. The gas-fired grill according to claim 1 further comprising at least one partition upward-standing from said bottom panel for dividing said smoke-generating chamber into at least two portions.

3. The gas-fired grill according to claim 2 wherein said at least one slot further comprises a plurality of slots provided in spaced relationship in said bottom panel and said at least one partition further comprises a plurality of partitions upward-standing from said bottom panel in spaced, substantially parallel relationship.

4. The gas-fired grill according to claim 3 further comprising cap means adapted to selectively seal said vent and prevent smoke from traversing said vent.

* * * * *